United States Patent
Barber et al.

(12)

(10) Patent No.: US 10,451,139 B2
(45) Date of Patent: Oct. 22, 2019

(54) DAMPING COEFFICIENT-REGULATING INDUCTIVE HEATING SYSTEMS AND ISOLATOR ASSEMBLIES INCLUDING THE SAME

(71) Applicant: HONEYWELL INTERNATIONAL INC., Morris Plains, NJ (US)

(72) Inventors: Tim Daniel Barber, Litchfield Park, AZ (US); Timothy Hindle, Peoria, AZ (US); Ken Young, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/826,989

(22) Filed: Nov. 30, 2017

(65) Prior Publication Data
US 2019/0162267 A1    May 30, 2019

(51) Int. Cl.
*F16F 9/52* (2006.01)
*F16F 9/53* (2006.01)
(Continued)

(52) U.S. Cl.
CPC .......... *F16F 9/52* (2013.01); *F16F 9/53* (2013.01); *F16F 13/007* (2013.01); *H05B 6/06* (2013.01);
(Continued)

(58) Field of Classification Search
CPC ........ F16F 2228/066; F16F 9/52; F16F 9/526; F16F 9/53; H05B 6/06
See application file for complete search history.

(56) References Cited

U.S. PATENT DOCUMENTS 3,067,841 A * 12/1962 Kendall ............... F16F 5/00
188/268
3,178,913 A * 4/1965 Olson ............... D06F 39/00
118/302
(Continued)

FOREIGN PATENT DOCUMENTS

DE  102008058358 A1 * 5/2010 ............. F16F 9/53
EP  2455555 A1  5/2012
(Continued)

OTHER PUBLICATIONS

EPO translation. DE 10 2008 058 358 A1, May 27, 2010. (Year: 2010).*
KR 101791646 B1 document. Oct. 30, 2017. (Year: 2017).*

*Primary Examiner* — Thomas J Williams
(74) *Attorney, Agent, or Firm* — Lorenz & Kopf, LLP

(57) ABSTRACT

Damping coefficient-regulating inductive heating systems are provided, as are isolator assemblies containing such inductive heating systems. In embodiments, the isolator assembly includes a damper coefficient-regulating inductive heating system and at least one isolator, which contains a hydraulic damper fillable with a damping fluid. The damper coefficient-regulating inductive heating system includes, in turn, an inductive heating device, a controller, and a sensor for monitoring data indicative of damping fluid temperature. The inductive heating device is positioned around a periphery of the hydraulic damper, such as the outer periphery of the damper, in a non-contacting relationship. During isolator operation, the controller receives data from the sensor and, in response thereto, controls the inductive heating device to selectively generate a varying magnetic field to induce heating of one or more damper components, such as metal bellows, in contact with the damping fluid.

18 Claims, 3 Drawing Sheets

(51) Int. Cl.
   *H05B 6/06* (2006.01)
   *F16F 13/00* (2006.01)
   *H05B 6/10* (2006.01)
   *F16F 9/42* (2006.01)

(52) U.S. Cl.
   CPC ............... *H05B 6/108* (2013.01); *F16F 9/42* (2013.01); *F16F 2228/066* (2013.01); *F16F 2230/18* (2013.01)

(56) References Cited

U.S. PATENT DOCUMENTS

| | | | |
|---|---|---|---|
| 3,214,116 A * | 10/1965 | Utting | B60G 17/01933 |
| | | | 244/104 R |
| 4,057,212 A | 11/1977 | Schubert | |
| 4,471,191 A * | 9/1984 | Greis | H05B 6/108 |
| | | | 219/629 |
| 4,561,614 A | 12/1985 | Olikara et al. | |
| 4,666,180 A | 5/1987 | Shirakuma | |
| 4,842,106 A | 6/1989 | Ludwig et al. | |
| 5,332,070 A | 7/1994 | Davis et al. | |
| 5,990,465 A * | 11/1999 | Nakaoka | H05B 6/108 |
| | | | 219/629 |
| 6,170,621 B1 | 1/2001 | Nakahara et al. | |
| 6,247,683 B1 | 6/2001 | Hayakawa et al. | |
| 6,250,615 B1 | 6/2001 | Leibach | |
| 6,260,677 B1 | 7/2001 | Hayakawa et al. | |
| 6,715,591 B2 | 4/2004 | Davis | |
| 6,920,966 B2 | 7/2005 | Buchele et al. | |
| 7,174,734 B2 | 2/2007 | Davern et al. | |
| 8,899,389 B2 | 12/2014 | Smith et al. | |
| 9,051,986 B2 | 6/2015 | Modrzejewski et al. | |
| 9,353,820 B2 | 5/2016 | Schofield et al. | |
| 9,475,594 B2 | 10/2016 | Barber et al. | |
| 9,682,602 B2 | 6/2017 | Morita et al. | |
| 2006/0180417 A1 | 8/2006 | Ruebsamen et al. | |

FOREIGN PATENT DOCUMENTS

| | | |
|---|---|---|
| KR | 101791646 B1 * | 10/2017 |
| WO | 2016169263 A1 | 10/2016 |
| WO | 2017183988 A1 | 10/2017 |

* cited by examiner

DAMPING COEFFICIENT-REGULATING INDUCTIVE HEATING SYSTEMS AND ISOLATOR ASSEMBLIES INCLUDING THE SAME

TECHNICAL FIELD

The present disclosure relates generally to isolators and, more particularly, to damping coefficient-regulating inductive heating systems utilized in conjunction with isolators containing hydraulic dampers, as well as to isolator assemblies including inductive heating systems combined with isolators.

BACKGROUND

Vibration isolation systems are utilized in various applications to minimize the transmission of disturbance forces between two bodies or structures. Satellite and other spacecraft, for example, are commonly equipped with vibration isolation systems to reduce the transmission of high frequency vibratory forces or "jitter" emitted from attitude adjustment devices, such as control moment gyroscopes or reaction wheel arrays, to other vibration-sensitive components onboard the spacecraft. The performance of such vibration isolation systems is determined by several factors including the number of isolators within the isolation system, the manner in which the isolators are arranged, and the vibration attenuation characteristics of each individual isolator. Vibration isolation systems employing three parameter isolators, which behave mechanically as a primary spring in parallel with a series-coupled tuning spring and hydraulic damper, generally provide superior attenuation of high frequency vibrations as compared to vibration isolation systems employing other passive isolators, such as viscoelastic isolators. An example of a three parameter isolator is the D-STRUT® isolator developed and commercially marketed by Honeywell, Inc., currently headquartered in Morristown, N.J. Such isolators are usefully implemented as passive, frictionless or near frictionless, single Degree of Freedom (DOF), axially-damping devices utilized within multi-point mounting arrangements.

While capable of providing high performance vibration attenuation without direct reliance upon circuitry or other electronics, existing passive three parameter isolators remain limited in certain respects. During isolator operation, fluctuations in the damping coefficient or "$C_A$" value of a hydraulic damper can occur due to variations in damping fluid temperature and viscosity. In the majority of applications, such variations in damping fluid temperature and viscosity are relatively minor and, therefore, have negligible impact on $C_A$ value variation. In specialized applications, however, significant variances in damping fluid temperature and viscosity can occur during isolator operation resulting in undesired $C_A$ value variations or changes. This may be the case when, for example, an isolator is deployed within an environment characterized by broad ambient temperature ranges or changes in solar exposure with poor atmospheric shielding; e.g., as may occur in the context of spaceborne and high altitude applications. When sufficiently pronounced, $C_A$ value variations can detract from isolator performance, particularly when an isolator is tuned for optimal vibration attenuation over a relatively narrow vibrational band or critical mode of the larger system.

There thus exists an ongoing demand for systems capable of enhancing the performance of hydraulic damper-containing isolators through reduced $C_A$ value variation. Ideally, embodiments of such $C_A$-regulating systems would be well-suited for usage in conjunction with passive, single DOF, three parameter isolators having frictionless or near frictionless designs. It would also be desirable if, in at least some embodiments, such $C_A$-regulating systems could be imparted with modular designs facilitating installation onto and removal from selected isolators at any desired juncture following original isolator manufacture. Finally, it would be desirable to provide isolator assemblies containing such $C_A$-regulating systems combined with one or more hydraulic damper-containing isolators. Other desirable features and characteristics of embodiments of the present invention will become apparent from the subsequent Detailed Description and the appended Claims, taken in conjunction with the accompanying drawings and the foregoing Background.

BRIEF SUMMARY

Isolator assemblies containing damping coefficient-regulating inductive heating systems are provided. In various embodiments, the isolator assembly includes a damping coefficient-regulating or "$C_A$-regulating" inductive heating system and at least one isolator, such as a three parameter isolator, containing a hydraulic damper fillable with a selected damping fluid. The $C_A$-regulating inductive heating system includes, in turn, an inductive heating device, a controller, and a sensor for monitoring data indicative of damping fluid temperature; that is, the temperature of the damping fluid within the hydraulic damper. The inductive heating device is positioned around a periphery of the hydraulic damper, such as the outer periphery or circumference of the damper, in a non-contacting relationship. During isolator operation, the controller receives data from the sensor and, in response thereto, controls the inductive heating device to selectively generate a varying magnetic field to induce heating of one or more damper components, such as metal bellows, in contact with the damping fluid.

In further embodiments, the isolator assembly includes an isolator containing a hydraulic damper fillable with a damping fluid. The hydraulic damper includes, in turn: (i) first and second hydraulic chambers containing the damping fluid when the damper is filled therewith; (ii) first and second metal bellows peripherally bounding the first and second hydraulic chambers, respectively; and (iii) a restricted orifice, such as an annulus, through which the first and second hydraulic chambers are fluidly coupled. An inductive heating shroud is positioned around an outer circumference of the hydraulic damper in a non-contacting relationship such that a circumferential clearance is formed between the inductive heating shroud and the hydraulic damper. When energized, the inductive heating shroud directs inductive input energy (e.g., in the form of a variable magnetic field) through the circumferential clearance and to hydraulic damper in a manner driving inductive heating of one or more damper components, such as metal bellows, contacting the damping fluid.

Embodiments of a $C_A$-regulating inductive heating system are further provided. The $C_A$-regulating inductive heating system is utilized in conjunction with an isolator, such as a three parameter isolator, containing a hydraulic damper fillable with a damping fluid. In various embodiments, the $C_A$-regulating inductive heating system includes an inductive heating device, which is positioned around a periphery of the hydraulic damper in a non-contacting relationship when the $C_A$-regulating inductive heating system is installed on the isolator. A sensor is configured to monitor data indicative of damping fluid temperature, and a controller is operably coupled to the inductive heating device and to the sensor. During operation of the $C_A$-regulating inductive heating system, the controller receives data from the sensor and, in response thereto, controls the inductive heating device to selectively generate a varying magnetic field to induce heating of one or more damper components, such as metal bellows, in contact with the damping fluid.

The foregoing summary is provided by way of non-limiting example only. Various additional examples, aspects, and other features of embodiments of the present disclosure are described in more detail below.

BRIEF DESCRIPTION OF THE DRAWINGS

At least one example of the present invention will hereinafter be described in conjunction with the following figures, wherein like numerals denote like elements, and.

Figure 1:
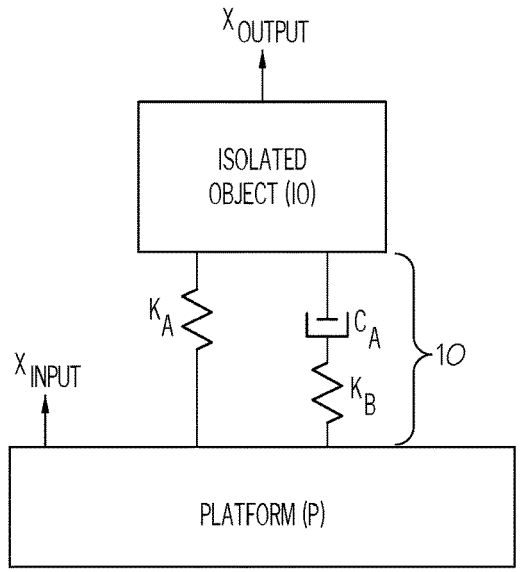
FIG. 1 is a schematic of a passive three parameter isolator coupled between two bodies or structures (here, an isolated object and a platform), as illustrated in accordance with the teachings of prior art.

For simplicity and clarity of illustration, descriptions and details of well-known features and techniques may be omitted to avoid unnecessarily obscuring the exemplary and non-limiting embodiments of the invention described in the subsequent Detailed Description. It should further be understood that features or elements appearing in the accompanying figures are not necessarily drawn to scale unless otherwise stated. For example, the dimensions of certain elements or regions in the figures may be exaggerated relative to other elements or regions to improve understanding of embodiments of the invention.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

The following describes isolator assemblies including hydraulic damper-containing isolators in combination with damping coefficient-regulating or "$C_A$-regulating" inductive heating systems. A given isolator assembly can include one or more hydraulic damper-containing isolators and a damper coefficient-regulating inductive heating system, which regulates or otherwise helps stabilize the damping coefficient of the hydraulic damper or dampers contained within the isolator assembly during operation thereof. Embodiments of the $C_A$-regulating inductive heating system are particularly well-suited for usage in conjunction with passive, single Degree of Freedom (DOF), axially-damping, three parameter isolators, which may provide frictionless or near frictionless operation. For this reason, embodiments of the $C_A$-regulating inductive heating system are primarily discussed in conjunction with (and embodiments of the isolator assemblies are primarily described as containing) passive three parameter isolators of this type. This notwithstanding, embodiments of the below-described $C_A$-regulating inductive heating system are not restricted to usage with passive three parameter isolators in all instances, but rather can be utilized in conjunction with various other types of isolators containing hydraulic dampers and benefiting from selective damping fluid heating.

The below-described isolator assemblies can be manufactured as integral units in embodiments. In this case, the $C_A$-regulating inductive heating system may be integrated into at least one hydraulic damper-containing isolator in a manner preventing inductive heating system removal without disassembly of the isolator, at least in substantial part. Alternatively, embodiments of the $C_A$-regulating inductive heating system can be imparted with a more modular design, which facilitates inductive heating system installation at any desired juncture subsequent to original isolator manufacture. This latter approach usefully permits the $C_A$-regulating inductive heating system to be offered as an optional feature or augmented solution, which can be retrofit onto selected isolators when desired to enhance flexibility in addressing customer desires and specific mission requirements. Further, when imparted with such a modular design, embodiments of the $C_A$-regulating inductive heating system can be retrofit onto selected isolators without impacting overall isolator performance, beyond providing the desired performance enhancements via improved $C_A$ value regulation. For example, in the context of three parameter isolators having frictionless or near frictionless designs, embodiments of the $C_A$-regulating inductive heating system may contain at least one inductive heating device positionable around a hydraulic damper in a non-contacting relationship in a manner avoiding the introduction of friction into isolator movements. The inductive heating system, in effect, may be transparent to isolator operation. As further benefit, the non-contacting design of the inductive heating system may eliminate the need for flexible wired connections or other physical connections spanning dynamic interfaces.

Embodiments of the $C_A$-regulating inductive heating system utilize an inductive heating approach to allow selective heating of the damping fluid, preferably without physical contact between the inductive heating device and the dynamic components of the hydraulic damper. The inductive heating device of the inductive heating system may contain one or more electromagnetic coils, which are positioned for electromagnetic communication with damper components composed of a material susceptible to inductive heating, such as a ferromagnetic alloy. Such damper components can include, for example, metal bellows bounding peripheries of the hydraulic chambers of the damper; metal bellows caps or cups sealingly attached to the metal bellows; and/or a damper piston sealingly attached to the metal bellows. When appropriately energized, the electromagnetic coils generate a variable magnetic field driving inductive heating of these damper components and, by extension, the damping fluid in contact therewith. In embodiments in which the inductive heating device is positioned around an outer periphery of the hydraulic damper, the inductive heating device may direct such electromagnetic inductive input energy through a main spring and, perhaps, a tuning spring, which circumscribe or extend around the damper. If desired, the main spring and/or the tuning spring may be fabricated from a material less prone to inductive heating than are the inductively-heated components of the damper. Exemplary embodiments of isolator assemblies including $C_A$-regulating inductive heating systems are described below in conjunction with FIGS. 3-5. First, however, an overarching description of three parameter isolators is provided in conjunction with FIGS. 1 and 2.

FIG. 1 is a schematic representation of a passive three parameter isolator 10, as illustrated in accordance with the teachings of prior art. In this example, three parameter isolator 10 is mechanically coupled between an isolated object "10" and a platform "P." In one embodiment, platform P is a satellite or other spacecraft, while isolated object 10 is an optical bench or other vibration-sensitive payload carried by the spacecraft. In another embodiment, platform P is an aircraft and isolated object 10 is a gas turbine engine, such as an auxiliary power unit, which generates vibrations desirably attenuated prior to reaching the aircraft fuselage. In still further embodiments, platform P can be a different type of vehicle or structure, while isolated object 10 can assume various other forms. As modeled, three parameter isolator 10 includes the following mechanical elements or components: (i) a first spring component $K_A$, which is mechanically coupled between isolated object 10 and platform P; (ii) a second spring component $K_B$, which is mechanically coupled between isolated object 10 and platform P in parallel with first spring component $K_A$; and (iii) a damper $C_A$, which is mechanically coupled between isolated object 10 and platform P in parallel with the first spring component $K_A$ and in series with the second spring component $K_B$. Transmissibility of three parameter isolator 10 is expressed by the following equation:

$$T(\omega) = \frac{X_{output}(\omega)}{X_{input}(\omega)} \qquad \text{EQ. 1}$$

wherein $T(\omega)$ is transmissibility, $X_{output}(\omega)$ is the output motion of isolated object 10, and $X_{Input}(\omega)$ is the input motion imparted to three parameter isolator 10 by platform P.

Figure 2:
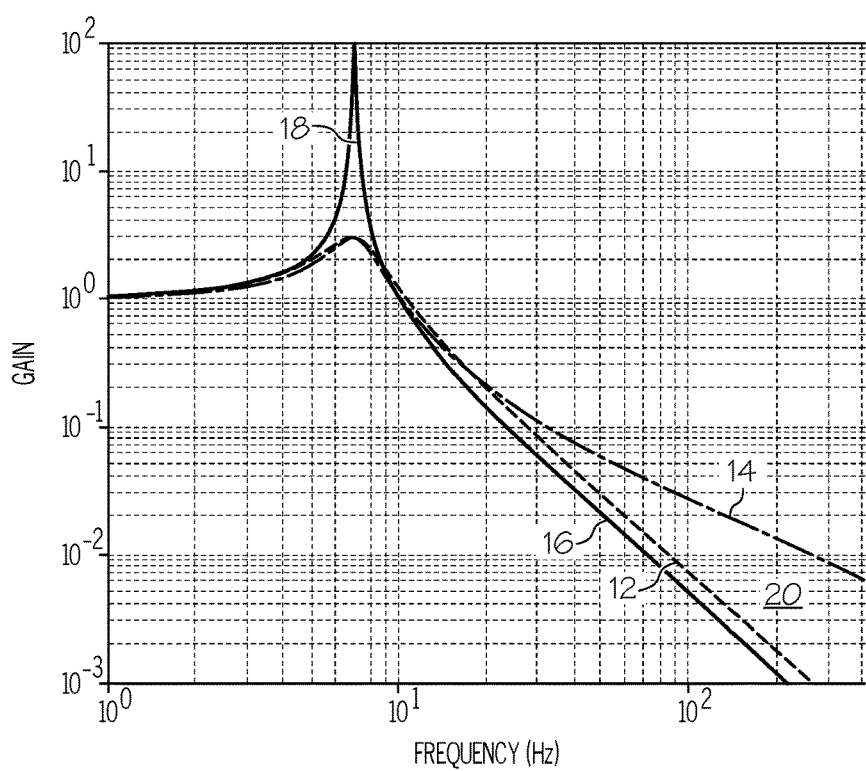
FIG. 2 is a transmissibility plot of frequency (horizontal axis) versus gain (vertical axis) illustrating the transmissibility profile of the three parameter isolator shown in FIG. 1 as compared to the transmissibility profiles of a two parameter isolator and an undamped device.

FIG. 2 is a transmissibility plot illustrating the damping characteristics of three parameter isolator 10 (curve 12) as compared to a two parameter isolator (curve 14) and an undamped device (curve 16). As indicated in FIG. 2 at peak 18, the undamped device (curve 16) provides a relatively high peak gain at a threshold frequency, which, in the illustrated example, is moderately less than 10 Hertz. By comparison, the two parameter device (curve 14) provides a significantly lower peak gain at the threshold frequency, but an undesirably gradual decrease in gain with increasing frequency after the threshold frequency has been surpassed (referred to as "roll-off"). Here, the roll-off of the two parameter device (curve 14) is approximately −20 decibel per decade ("dB/decade"). Lastly, the three parameter device (curve 12) provides a low peak gain substantially equivalent to that achieved by the two parameter device (curve 14) and further provides a relatively steep roll-off of about −40 dB/decade. The three parameter device (curve 12) thus provides a significantly lower transmissibility at higher frequencies, as quantified in FIG. 2 by the area 20 bound by curves 12 and 14. By way of non-limiting example, further discussion of three parameter isolators can be found in U.S. Pat. No. 5,332,070, entitled "THREE PARAMETER VISCOUS DAMPER AND ISOLATOR," issued Jan. 26, 1994; and U.S. Pat. No. 7,182,188 B2, entitled "ISOLATOR USING EXTERNALLY PRESSURIZED SEALING BELLOWS," issued Feb. 27, 2007;

Passive three parameter isolators, such as isolator 10 schematically illustrated in FIG. 1, can thus be tuned to provide superior damping characteristics (e.g., lower overall transmissibilities) over targeted vibrational frequency ranges as compared to undamped devices and two parameter devices. Further, in contrast to viscoelastic dampers, the stiffness and damping characteristics of passive three parameter isolators are tunable on an independent basis. Consequently, when six or more isolators are arranged in a multi-point system, each three parameter isolator can be specifically tuned to provide optimal stiffness and damping in each degree of freedom to minimize vibration transmittance between a platform (e.g., platform P schematically shown in FIG. 1) and an isolated object supported thereby (e.g., isolated object 10 further shown in FIG. 1). For at least this reason, three parameter isolators are often utilized in applications in which high performance vibration isolation is required over relatively targeted vibrational bands encompassing one or more critical modes of the larger system. In certain instances, however, pronounced variations in the $C_A$ value of hydraulic damper can detract from overall isolator performance. Thus, in such instances, embodiments of such three parameter isolators are usefully combined with $C_A$-regulating inductive heating systems of the type described below to enhance isolator performance through reduced $C_A$ value variation. An exemplary isolator assembly including at least one passive three parameter isolator combined with a $C_A$-regulating inductive heating system will now be described in conjunction with FIGS. 3-4.

Figure 3:
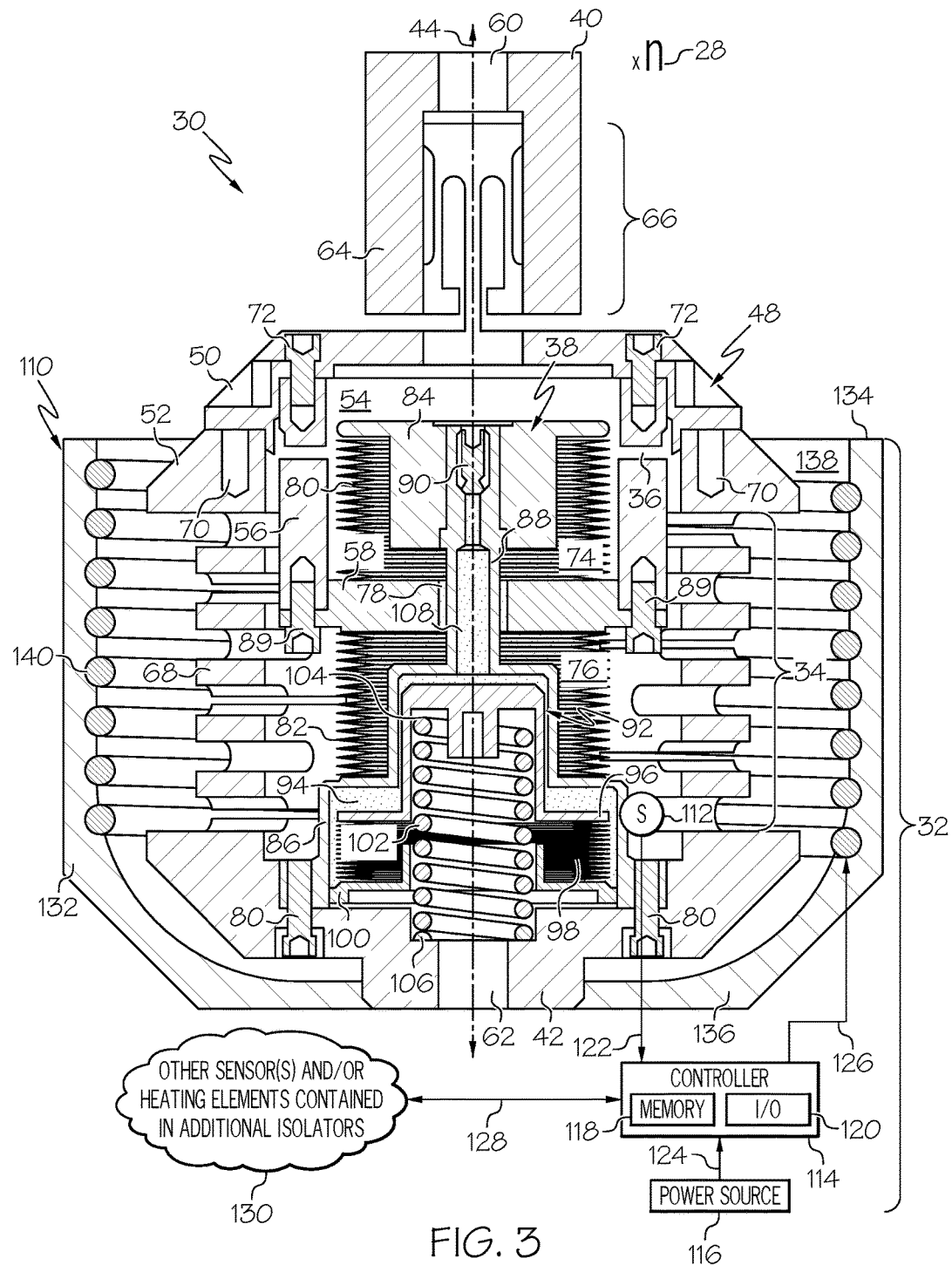
FIGS. 3-4 are cross-sectional and side views, respectively, of an isolator assembly including a three parameter isolator and a $C_A$-regulating inductive heating system, which inductively heats one or more damper components when energized, as illustrated in accordance with an exemplary embodiment of the present disclosure.
Figure 4:
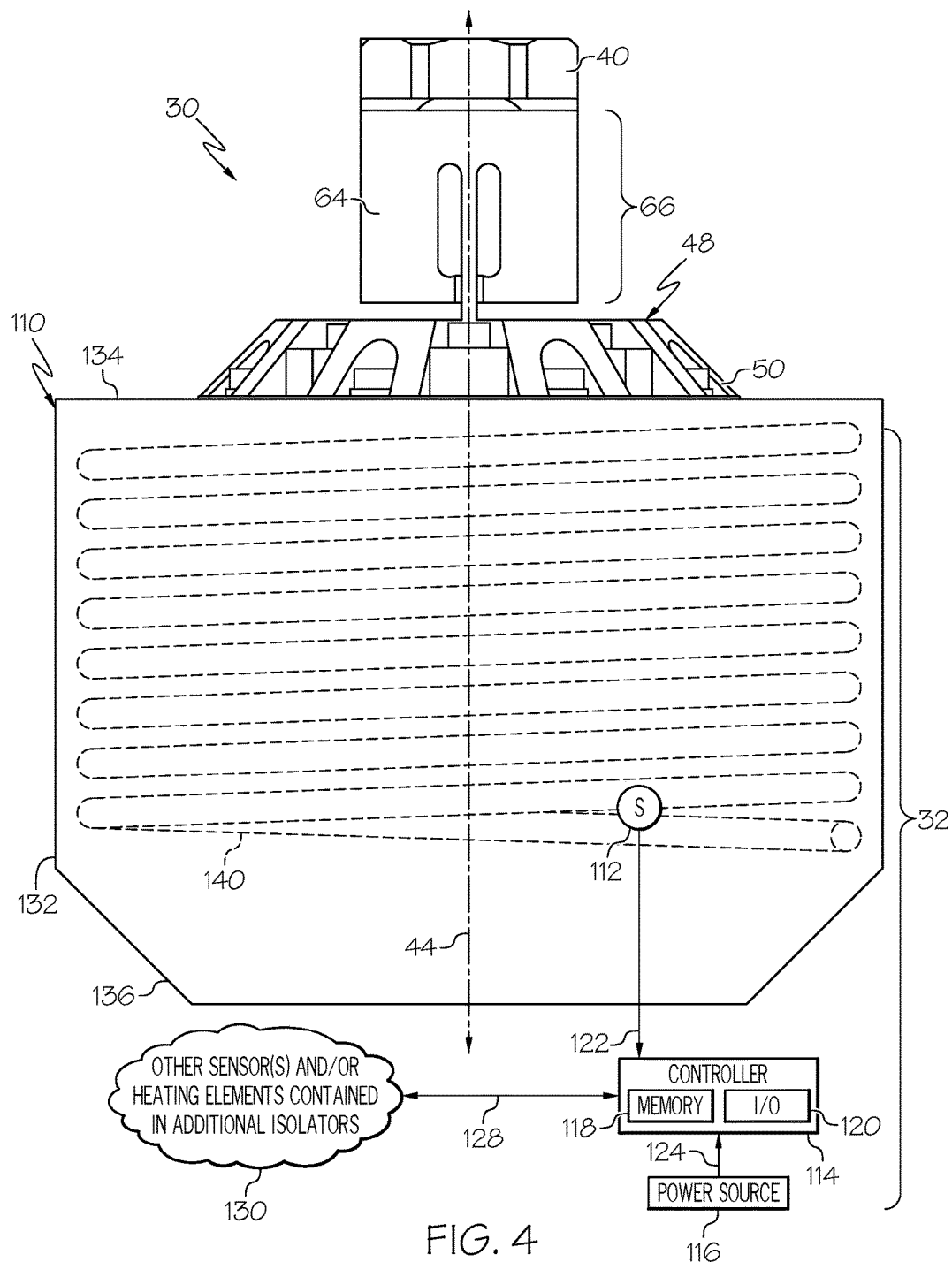

FIGS. 3-4 are cross-sectional and side views, respectively, of an isolator assembly 30, 32, as illustrated in accordance with an exemplary embodiment of the present disclosure. Isolator assembly 30, 32 includes at least hydraulic damper-containing isolator 30 and a $C_A$-regulating inductive heating system 32. While only a single isolator 30 is shown for illustrative clarity, isolator assembly 30, 32 can include any practical number of additional isolators, as indicated in FIG. 3 by symbol 28. When included within assembly 30, 32 such additional isolators may be similar or substantially identical to isolator 30; consequently, the following description is equally applicable thereto. In other implementations, isolator assembly 30, 32 may contain only a single hydraulic damper-containing isolator 30 in combination with $C_A$-regulating inductive heating system 32. Isolator 30 is a passive three parameter isolator in the illustrated example, which represents one possible physical realization of three parameter isolator 10 schematically depicted in FIG. 1. Accordingly, during the course of the following description, isolator 30 is also referred to more fully as "three parameter isolator 30."

As shown most clearly in FIG. 3, three parameter isolator 30 includes a primary or "main" spring 34, a secondary or "tuning" spring 36, and a hydraulic damper 38. Tuning spring 36 and hydraulic damper 38 are mechanically coupled in series between opposing isolator end portions 40, 42, which are spaced along a working axis 44 of isolator 30. Main spring 34 is further mechanically coupled between opposing isolator end portions 40, 42, but in parallel with hydraulic damper 38 and tuning spring 36. As a result of this structural design, two parallel vibration transmission paths are provided through three parameter isolator 30: a first "$K_A$" vibration transmission path and a second "$K_B$–$C_A$" vibration transmission path. Moving from top to bottom in FIG. 3, the $K_A$ vibration transmission path extends from isolator end portion 40, through main spring 34, and to isolator end portion 42, while bypassing tuning spring 36 and damper 38. Comparatively, the $K_B$–$C_A$ vibration transmission path extends from isolator end portion 40, through tuning spring 36, through hydraulic damper 38, and to isolator end portion 42, while bypassing main spring 34.

The parameters of three parameter isolator 30 may be generally defined as follows. The $K_A$ parameter is the axial stiffness of three parameter isolator 30, considered in its entirety, as predominately determined by the axial stiffness of main spring 34; that is, the stiffness of spring 34 taken along working axis 44 of isolator 30. The $K_B$ parameter of isolator 30 is predominately determined by the axial stiffness of tuning spring 36 in series with the volumetric stiffness of the damper bellows. Finally, the $C_A$ parameter or value is the damping coefficient of hydraulic damper 38. The $C_A$ value of hydraulic damper 38 is determined by multiple factors including the structural characteristics of damper 38, such as the dimensions of the restricted orifice or orifices through which the hydraulic chambers of damper 38 are fluidly coupled; the characteristics of the damping fluid with which damper 38 is filled; and damping fluid temperature at a given point in time.

Three parameter isolator 30 can assume various different structural forms, with the example shown in FIGS. 3-4 representing but one suitable possibility. This understood, a more detailed explanation of the structural features of isolator 30 will now be provided. Three parameter isolator 30 includes an isolator casing or outer housing assembly 48, which can be assembled from any number and type of discrete components or parts. In the illustrated example, specifically, outer housing assembly 48 is assembled from two outer housing pieces 50, 52, which define isolator end portions 40, 42, respectively. A first mount interface 60 is provided in outer housing piece 50 at isolator end portion 40, while a second mount interface 62 is provided in outer housing piece 52 at isolator end portion 42. When three parameter isolator 30 and, more generally, isolator assembly 30, 32 is incorporated into a larger vibration isolation system, isolator end portion 42 may be mounted to a platform utilizing, for example, a mounting bracket engaging mount interface 62. Comparatively, isolator end portion 40 of isolator 30 can be attached directly or indirectly to a payload; e.g., mount interface 60 may be bolted to or otherwise attached to a bench or palette supporting the payload. Alternatively, the orientation of three parameter isolator 30 may be inverted such that isolator end portion 40 is mounted to the platform, while first isolator end portion 42 is secured to the payload. In either case, isolator end portions 40, 42 serve as opposing mechanical inputs/outputs of isolator 30.

Addressing specifically housing piece 50 shown in the upper portions of FIGS. 3-4, outer housing piece 50 includes a flanged end portion from which an elongated stem 64 extends along working axis 44. A series of openings is formed in elongated stem 64 to define a flexure structure 66 accommodating mounting misalignments and/or affording isolator 30 with additional freedom of movement. Outer housing piece 52, by comparison, includes a generally tubular or cylindrical body 68 extending along working axis 44. An end portion of body 68 abuts and is fixedly coupled to housing piece 50 in some manner. For example, a first ring of bolts or other fasteners (not shown) may be inserted into fastener openings 70 to fixedly attach outer housing pieces 50, 52 such that the open end of tubular body 68 abuts the flanged end of housing piece 52. Similarly, inner housing piece 56 may be fixedly joined to the flange portion of housing piece 50 utilizing a second ring of bolts 72. When so joined, outer housing pieces 50, 52 cooperate or combine to define an internal chamber or inner cavity 54 within housing assembly 48. Hydraulic damper 38 is housed within inner cavity 54, as is a tubular inner housing piece 56 mechanically coupled to damper 38; e.g., a damper piston 58 included in damper 38 may be fixedly coupled to housing piece 56 utilizing bolts 89.

In certain embodiments, main spring 34 and/or tuning spring 36 may be realized as discrete structural elements, such as wireform springs, disposed between opposing isolator end portions 40, 42. In other embodiments, one or both of springs 34, 36 may be implemented as a gas spring. As a still further possibility, one or both of springs 34, 36 may assume the form of machined springs; e.g., resilient, compressible structures created by removal of material from selected portions of housing pieces 50, 52. In this latter regard, and as shown most clearly in FIG. 3, main spring 34 may be formed in an annular section or sidewall of tubular body 68 of outer housing piece 52. In one implementation, main spring 34 is a machined spring formed in tubular body 68 of outer housing piece 52 by the removal of material, such as by laser cutting or Electrical Discharge Machining (EDM) wire removal, to yield a compressible resilient structure. Similarly, tuning spring 36 may assume the form of a section of the annular sidewall of inner housing piece 56 from which material has been removed to form a resilient structure compressible along working axis 44. Tuning spring 36 thus further circumscribes hydraulic damper 38 and is itself circumscribed by outer housing piece 52 in the illustrated example.

Turning now to a more detailed discussed of damper 38, hydraulic damper 38 can assume various different structural forms; however, generally stated, hydraulic damper 38 will typically contain at least one restricted orifice, such as an annulus, through which damping fluid flows as damper piston 58 strokes along working axis 44 to provide the desired damping effect. In various implementations, hydraulic damper 38 may be a constant volume damper; that is, a damper in which the cumulative volume of the hydraulic chambers located on opposing sides of damper piston 58 remains constant as the piston strokes along working axis 44. In other embodiments, this may not be the case. Hydraulic damper 38 is usefully, although non-essentially imparted with a frictionless or near frictionless design; that is, a design lacking sliding O-rings or other dynamic seals and instead containing frictionless or near frictionless sealing elements, such as metal bellows of the type described below.

In addition to damper piston 58, hydraulic damper 38 contains a first hydraulic chamber 74, a second hydraulic chamber 76, and an annulus 78 through which hydraulic chambers 74, 76 are fluidly coupled. A first metal bellows 80 peripherally bounds or circumscribes hydraulic chamber 74, while a second metal bellows 82 peripherally bounds or circumscribes hydraulic chamber 76. As metal bellows 80, 82 bound the respective outer peripheries of hydraulic chambers 74, 76, metal bellows 80, 82 are properly referred to as "internally-pressurized." In other embodiments, metal bellows 80, 82 may bound inner peripheries of the hydraulic chambers and may thus be externally-pressurized. In such embodiments, $C_A$-regulating inductive heating system 32 can include one or more heating elements nested or extending within metal bellows 80, 82; or the heating elements of inductive heating system 32 may be positioned around the outer periphery of the bellows. Metal bellows 80, 82 will often, but need not necessarily have substantially equivalent lengths, wall thicknesses, and radial and axial stiffnesses. Metal bellows 80, 82 can be realized as, for example, edge-welded metal bellows fabricated from a selected alloy. In implementations in which it is desired to inductively heat one or more components of hydraulic damper 38, metal bellows 80, 82 are advantageously produced from a ferromagnetic material, such as magnetic series stainless steel, or other material susceptible to inductive heating when immersed in a variable magnetic field.

A first end portion of metal bellows 80 is welded or otherwise sealingly joined to a first cap piece or "bellows cup" 84. The opposing end portion of metal bellows 80 is welded or otherwise sealingly joined to a first face of damper piston 58. Similarly, a first end portion of metal bellows 82 is joined to the opposing face of damper piston 58, while the opposing end of metal bellows 82 is joined to a second bellows cup 86. Bellows cups 84, 86 are rigidly joined by a connecting rod 88, which extends along working axis 44 through a central opening provided in damper piston 58. Connecting rod 88 and damper piston 58 bound the inner periphery and the outer periphery of annulus 78, respectively. Connecting rod 88 may be integrally formed with bellows cup 86 and may extend therefrom along axis 44 to bellows cup 84, with a fixed coupling formed between bellows cup 84 and rod 88 via, for example, threaded attachment. Such an arrangement imparts hydraulic damper 38 with a floating end portion and a fixed end portion, as generally corresponding to bellows cup 84 and bellows cup 86, respectively. The fixed end portion of hydraulic damper 38 (the lower end portion of damper 38 in the orientation shown in FIG. 3) is "fixed" in the sense that this end portion is immobile (does not move) with respect to isolator end portion 42, and below-described inductive heating device 110, as bellows 80, 82 expand and contract along working axis 44. Conversely, the floating end portion of hydraulic damper 38 (the lower end portion of damper 38 in FIG. 3) moves with respect to isolator end portion 42, and below-described inductive heating device 110, as bellows 80, 82 expand and contract along axis 44.

Hydraulic chamber 74 is principally defined by metal bellows 80, bellows cup 84, connecting rod 88, and a first face of damper piston 58. Comparatively, hydraulic chamber 76 is principally defined by metal bellows 82, bellows cup 86, connecting rod 88, and a second opposing face of damper piston 58. During usage of three parameter isolator 30, damping fluid is exchanged between hydraulic chambers 74, 76 as damper piston 58 strokes along working axis 44 and the respective chamber volumes vary. As damping fluid flows between hydraulic chambers 74, 76, the damping fluid is forced through annulus 78 to provide the desired damping effect. Hydraulic damper 38 is a constant volume damper in the illustrated example. Accordingly, the cumulative volume of hydraulic chambers 74, 76 remains substantially constant as damper piston strokes 58 along working axis 44. To enable such operation, hydraulic chambers 74, 76 are produced as fluid-tight chambers or compartments, which are filled with a damping fluid (represented by dot stippling) prior to usage of three parameter isolator 30. Three parameter isolator 30 may initially be produced and distributed without damping fluid, which may then be introduced into hydraulic chambers 74, 76 through a fill port 90 prior to isolator usage.

Three parameter isolator 30 may further include a thermal compensator or "TC" 92, which helps accommodate thermally-induced changes in damping fluid volume and/or helps pressurize the fluid contained within hydraulic damper 38. In the illustrated example, TC 92 includes a TC chamber 94, a TC piston 96, a TC bellows 98, and a TC bellows cup 100, and a TC preload spring 102. TC preload spring 102 is compressed between a first spring seat 104, which is provided within TC piston 96; and a second spring seat 106, which is provided within the closed end portion of outer housing piece 52. TC preload spring 102 urges sliding movement of TC piston 96 towards a position in which TC chamber 94 is imparted with a lesser volume. TC chamber 94 is fluidly coupled to main hydraulic chambers 74, 76 through a channel 108 provided in connecting rod 88. Damping fluid exchange is thus permitted between TC chamber 94 and main hydraulic chambers 74, 76 in conjunction with changes in damping fluid volume. Specifically, as damping fluid volume increases, damping fluid may flow from hydraulic chambers 74, 76, through channel 108, and into TC chamber 94. The volumetric expansion of the damping fluid exerts sufficient force on the effective area of TC piston 96 to urge piston 96 to move toward isolator end portion 42 (downward in the orientation of FIG. 3), compress TC bellows 98 and TC preload spring 102, and increase the capacity of TC chamber 94. Conversely, as damping fluid volume and pressure decreases, the expansive force of TC preload spring 102 and an inherent resiliency of TC bellows 98 causes piston 96 to move toward isolator end portion 40 (upward in the illustrated orientation) thereby reducing the volumetric capacity of TC chamber 94 and urging damping fluid flow toward hydraulic chambers 74, 76.

In the above-described manner, TC 92 provides a variable-volume capacity to accommodate thermally-induced fluctuations in damping fluid volume. The inclusion of TC 92, however, does little to accommodate thermally-induced changes in damping fluid viscosity and corresponding fluctuations in damper $C_A$ value. Therefore, in embodiments in which hydraulic damper 38 and, more generally, three parameter isolator 30 is susceptible to non-negligible variations in $C_A$ value, isolator assembly 30, 32 is usefully further equipped with $C_A$-regulating inductive heating system 32. Further, due to the inclusion of $C_A$-regulating inductive heating system 32, embodiments of isolator assembly 30, 32 may be particularly well-suited for usage in applications vulnerable to undesired $C_A$ value variations absent the provision of inductive heating system 32. Examples of such environments include spaceborne and high altitude airborne environments in which significant changes in damping fluid temperature and viscosity can occur due to relatively broad ambient temperature ranges, variations in solar exposure levels with little to no atmospheric shielding, and other environmental factors. Generally, $C_A$-regulating inductive heating system 32 can assume any form suitable for selectively driving inducting heating of hydraulic damper 38 to warm the damping fluid in a controlled manner to prevent the damping fluid viscosity and the $C_A$ value of damper 38 from becoming undesirably high in the presence of such external factors. By way of non-limiting example, one possible manner in which $C_A$-regulating inductive heating system 32 can be physically implemented will now be described.

With continued reference to FIGS. 3-4, $C_A$-regulating inductive heating system 32 includes at least one inductive heating device 110, at least one sensor 112, a controller 114, a power source 116, a memory 118, and an input/output (I/O) interface 120. The various signal and power connections between the components of inductive heating system 32 are represented by lines 122, 124, 126, 128. Communication line 122, in particular, represents a data transmission connection from sensor 112 to an input of controller 114. This may be a wired or wireless data connection, including radio frequency and optical data connections, over which data can be transmitted from sensor 112 to controller 114. Controller 114 is further operably coupled to power source 116 by connection 124 and to inductive heating device 110 by connection 126, such as wired or cable connections. Finally, as indicated by double-headed arrow 128 and cloud symbol 130, controller 114 can communicate with additional sensors and/or inductive heating devices 110 included additional isolators. For example, in embodiments in which isolator assembly 30, 32 includes one or more additional non-illustrated isolators, controller 114 may further receive data from sensors contained in the non-illustrated isolators (which may be substantially identical to sensor 112) and/or may selectively energize inductive heating devices in such isolators (which may be substantially identical to inductive heating device 110). In this regard, cost, complexity, and part count reductions may be realized through the usage of a common controller 114 to control a plurality of inductive heating devices included in all or a subset of isolators within isolator assembly 30, 32, when containing more than one isolator.

As schematically depicted in FIGS. 3-4, controller 114 can encompass or may be associated with any suitable number of individual microprocessors, storage devices, interface cards, and other standardized components. Controller 114 may also include or cooperate with any number of firmware and software programs or instructions designed to carry-out the various processing functions described herein. Memory 118 can encompass any number and type of storage media suitable for storing computer readable code or instructions, as well as other data utilized to support the operation of inductive heating system 32. Memory 118 can contain or consist of a solid state, non-volatile storage media, such as flash memory, in embodiments. In various embodiments, memory 118 stores at least one predetermined temperature threshold above which the temperature of the damping fluid contained within hydraulic damper 38 is desirably maintained. Although illustrated as a separate block, memory 118 can be integrated into controller 114 in embodiments as, for example, a system-in-package, a system-on-a-chip, or another type of microelectronic package or module.

I/O interface 120 permits data communication with controller 114, whether over physical or wireless data connections. In certain implementations, I/O interface 120 may possess wireless communication capabilities to, for example, allow data captured by sensor 112 to be wirelessly reported to a remote entity for prognostic or diagnostic purposes and/or to allow modification of the temperature threshold(s) stored within memory 118. Power source 116 can assume any form suitable for supporting operation of controller 114, inductive heating device 110, and the other components of $C_A$-regulating inductive heating system 32. In many instances, power source 116 will contain one or more batteries, such as a battery bank, having a rechargeable chemistry. When isolator assembly 30, 32 is deployed onboard a satellite, any such batteries included in power source 116 may be recharged, when needed, by solar charging. Power source 116 can also include energy harvesting mechanisms and/or other energy-storage devices, such as one or more supercapacitors, in alternative embodiments.

During operation of $C_A$-regulating inductive heating system 32, sensor 112 supplies controller 114 with data indicative of the temperature of the damping fluid within hydraulic damper 38. Sensor 112 can be any device suitable for monitoring a parameter indicative of damping fluid temperature. In certain embodiments, sensor 112 can be a temperature sensor or a flow sensor, which directly measures damping fluid temperature or viscosity; albeit generally with a tradeoff in design complexity and additional sealing requirements. In other embodiments, sensor 112 can measure a different characteristic indicative of damping fluid temperature. For example, in certain embodiments, two or more sensors, such as Microelectromechanical System (MEMS) accelerometers, can be utilized to monitor vibration attenuation through isolator 30. Controller 114 may then solve for $C_A$, noting that $K_A$ and $K_B$ are known quantities, and convert $C_A$ to damping fluid temperature. These possibilities notwithstanding, sensor 112 will often assume the form of a temperature sensor configured to monitor the temperature of a component of hydraulic damper 38 in contact with the damping fluid. For example, in one implementation, sensor 112 assumes the form a temperature sensor, such as a thermistor, mounted to the fixed end portion of hydraulic damper 38 and configured to measure temperature of bellows 82 or bellows cup 86. Advantageously, such a mounting allows sensor 112 to remain stationary or fixed with respect to isolator end portion 42 as bellows 80, 82 expand and contract, while damper piston 58 strokes along working axis 44. In still further embodiments, sensor 112 may assume other forms, such as that of an ambient temperature sensor located remotely from isolator 30.

Turning lastly to heating device 110, inductive heating device 110 can be realized as any mechanism or device suitably controlled by controller 114 to apply inductive input energy to hydraulic damper 38 in a manner inducing heating of one or more damper components and the damping fluid in contact therewith. Inductive heating device 110 may be positioned around a periphery (inner or outer) of hydraulic damper 38 and, therefore, the respective peripheries of bellows 80, 82, preferably in a manner providing substantially even or uniform heating of hydraulic damper 38 along working axis 44. Designs in which inductive heating device 110 is positioned around inner peripheries bellows 80, 82, when internally-pressurized, are viable and contemplated. Alternatively, inductive heating device 110 may positioned about the exterior of hydraulic damper 38. For example, inductive heating device 110 may have a substantially annular or tubular form factor into which three parameter isolator 30 may be inserted, as shown in FIGS. 3-4. As isolator 30 is circumscribed by inductive heating device 110 when inserted therein, inductive heating device 110 may be referred to below as an "inductive heating shroud" or as an "inductive heating sleeve."

Inductive heating shroud 110 includes a generally tubular shroud body 132 having an open end portion 134 and a closed end portion 136, which are opposed along working axis 44. An inner cavity 138 is provided by shroud body 132, circumscribed by the annular sidewall of body 132, and accessible through open end portion 134. As indicated above, inner cavity 138 is dimensioned and shaped to receive three parameter isolator 30 therein; e.g., inner cavity 138 may have a generally cylindrical geometry with a diameter exceeding the maximum diameter of three parameter isolator 30, as generally shown in FIGS. 3-4. The annular sidewall of shroud body 132 is spaced from isolator 30, when inserted into or received within inductive heating shroud 110, to create a circumferential gap or clearance between inductive heating shroud 110 and an intermediate portion of isolator 30 and, therefore, between shroud 110 and hydraulic damper 38. Tubular shroud body 132 terminates in a base wall at closed end portion 136, which is fixedly coupled to outer isolator housing 48 at isolator end portion 42; e.g., utilizing mechanical fasteners or a threaded interface (not shown). Such a structural configuration facilitates installation of inductive heating shroud 110 on three parameter isolator 30 by retrofit attachment when so desired. Conversely, inductive heating shroud 110 can be readily removed from isolator 30 without disassembly thereof. Further, sensor 112 can be mounted to a selected location on damper 38, while the other components of inductive heating system 32 are installed on or adjacent the exterior of isolator 30. In this manner, $C_A$-regulating inductive heating system 32 is implemented in a modular manner, which enables installation of inductive heating system 32 (particularly, inductive heating device 110) on or adjacent three parameter isolator 30 as an "add-on" option or augmented solution.

With continued reference to FIGS. 3-4, inductive heating shroud 110 is positioned outside of both the $K_A$ and $K_B$-$C_A$ vibration transmission paths provided through isolator 30. Accordingly, isolator assembly 30, 32 may be described as including: (i) a first vibration transmission path (the above-described $K_A$ path) extending from isolator end portion 42, through main spring 34, and to second isolator end portion 40, while bypassing tuning spring 36, hydraulic damper 38, and inductive heating device 110; and (ii) a second vibration transmission path (the above-described $K_B$-$C_A$ path) extending from first isolator end portion 42, through hydraulic damper 38, through tuning spring 36, and to second isolator end portion 40, while bypassing main spring 34 and inductive heating shroud 110. In this manner, the non-contacting design of heat shroud 110 avoids the introduction of frictional losses and may consequently preserve the frictionless or near frictionless nature of hydraulic damper 38. Further, inductive heating shroud 110 is fixedly coupled to isolator end portion 42 and, therefore, maintains a fixed spatial relationship with the other components of isolator 30 remaining static with respect to end portion 42. So too may sensor 112 and the other components of heating system 32 maintain a fixed or static relationship with respect to isolator end portion 42 and the fixed end portion of hydraulic damper 38 as bellows 80, 82 expand and contract and damper piston 58 strokes along working axis 44. The need for flexible wired connections or other physical connections across dynamic interfaces is thus eliminated to enhance the simplicity and reliability of heating system 32.

At least one electromagnetic coil 140 is embedded in shroud body 132 or attached to the interior thereof. When activated by controller 114, electromagnetic coil 140 generates inductive input energy in the form of a varying magnetic field in which hydraulic damper 38 is immersed. Hydraulic damper 38 is fabricated to include one or more damper components, which contact the damping fluid within damper 38 and which are composed of a material susceptible or prone to inductive heating. Controller 114 may thus control inductive heating shroud 110 to initiate heating of such damper components when deemed appropriate by controller 114 utilizing suitable logic, such as a temperature-based feedback loop. In one exemplary approach, controller 114 may activate inductive heating shroud 110 to maintain the damping fluid temperature (as derived from the data supplied by sensor 112) above the predetermined temperature threshold stored in memory 118. Controller 114 may then cease activation of inductive heating shroud 110 or, perhaps, decrease the energy input when the damping fluid temperature surpasses the predetermined temperature threshold. In other embodiments, controller 114 may utilize other logic to determine when to active inductive heating device 110, such as a time-based heating schedule.

As indicated above, controller 114 selectively activates inductive heating device 110 to generate a variable magnetic field driving inductive heating of one or more (e.g., ferromagnetic) components within hydraulic damper 38 and contacting the damping fluid. Metal bellows 80, 82, in particular, may be fabricated from an alloy susceptible to inductive heating, such as a magnetic series stainless steel or other ferromagnetic material. In such embodiments, inductive heating device 110 and electromagnetic coil 140 may drive concurrent inductive heating of metal bellows 80, 82 at substantially equivalent rates to avoid or at least minimize the creation of thermal gradients within the damping fluid along working axis 44. Additionally or alternatively, bellows cups 84, 86 and/or piston 58 may be composed of a ferromagnetic alloy or other material having an appreciable inductive heating response and, therefore, may also undergo inductive heating when immersed in the variable magnetic field generated by inductive heating device 110. The damping fluid contained within hydraulic damper 38 is then warmed by contact or thermal transfer with the inductively-heated damper component or components of damper 38. Comparatively, housing pieces 50, 52, 56 and, therefore, main spring 34 and tuning spring 36 may be composed of a material that is non-susceptible or is less susceptible to inductive heating in the presence of the variable magnetic field generated by device 110; e.g., springs 34, 36 may be composed of a non-ferromagnetic material, such as non-magnetic titanium alloy. Inductive heating device body 132 may also be composed of a ceramic or other material less susceptible or non-susceptible to inductive heating and, perhaps, affords some level of thermal insulation to isolator 30. In this manner, targeted heating of the damping fluid can be induced, when deemed appropriate by controller 114, with negligible concurrent heating of main spring 34, tuning spring 36, and other non-damper components to avoid material stress, changes in spring constant, or other undesired effects that might otherwise occur within isolator 30.

The foregoing has thus provided at least one exemplary embodiment of an isolator assembly including isolator and a $C_A$-regulating heating system, which reduces variations in the $C_A$ value of a hydraulic isolator contained in the isolator. In so doing, embodiments of the $C_A$-regulating heating system enable the $C_A$ value of the hydraulic damper to be more precisely controlled over a wider temperature range to improve isolator performance. Embodiments of the $C_A$-regulating heating system may contain at least one an inductive heating device positioned in a non-contacting relationship with the hydraulic damper. The heating device is advantageously, although non-essentially produced as a module adapted for attachment and removal from a selected isolator without requiring disassembly thereof, thereby allowing the $C_A$-regulating heating system to be offered a retrofit or augmented solution. Furthermore, embodiments of the inductive heating device are usefully adapted to provide substantially even or uniform heating of the hydraulic damper to minimize any thermal gradients along the working axis of the isolator. Accordingly, in implementations in which the hydraulic damper contains first and second metal bellows peripherally bounding first and second hydraulic chambers of the damper, respectively, the inductive heating device may be adapted to concurrently heat the first and second metal bellows at substantially equivalent rates.

In the example discussed in conjunction with FIGS. 3-4, the $C_A$-regulating inductive heating system includes an inductive heating device or "inductive heating shroud" positioned around an outer periphery of the hydraulic damper in a manner permitting integration of the inductive heating device with minimal, if any, impact on existing isolator designs. In further embodiments, the $C_A$-regulating inductive heating system may include at least one inductive heating device positioned around an inner periphery of the hydraulic damper. This creates a nested design, which may be useful when the metal bellows of the damper are externally-pressurized. Moreover, a combination of such approaches can be utilized in embodiments in which the $C_A$-regulating inductive heating system includes multiple inductive heating devices; or the inductive heating device or devices contained within a given implementation of the inductive heating system may have a different positioning with respect to the isolator and, in particular, the hydraulic damper. Finally, as previously indicated, embodiments of the $C_A$-regulating heating system are advantageously utilized with three parameter isolators providing the desirable vibration attenuation characteristics described above; e.g., a relatively low peak transmissibility and superior attenuation of high frequency vibrations. This notwithstanding, alternative embodiments of the $C_A$-regulating heating system can also be utilized in conjunction with other types of isolators, such as single DOF, axially-damping, two parameter isolator including a main spring in parallel with the damper, but lacking a tuning spring in parallel with the main spring and in series with the damper.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. An isolator assembly, comprising:
   an isolator having a hydraulic damper fillable with a damping fluid, the isolator comprising:
      first and second isolator end portions, which are spaced along a working axis of the isolator; and
      a main spring coupled in parallel with the hydraulic damper between the first and second isolator end portions; and
   a damping coefficient-regulating inductive heating system, comprising:
      a sensor configured to monitor data indicative of a damping fluid temperature;
      an inductive heating device positioned around a periphery of the hydraulic damper in a non-contacting relationship, the inductive heating device circumscribing at least a portion of the main spring; and
      a controller operably coupled to the inductive heating device and the sensor, the controller configured to receive the data from the sensor and, in response thereto, control the inductive heating device to selectively apply inductive input energy to the hydraulic damper to heat the damping fluid contained therein.

2. The isolator assembly of claim 1 wherein hydraulic damper comprises a first damping fluid-contacting component, which is composed of a first material susceptible to induction heating and which contacts the damping fluid when the hydraulic damper is filled therewith; and
   wherein the inductive heating device, when energized, is configured generate a varying magnetic field in which the hydraulic damper is immersed to inductively heat the first damping fluid-contacting component and further heat the damping fluid in contact therewith.

3. The isolator assembly of claim 2 wherein the first damping fluid-contacting component comprises a metal bellows.

4. The isolator assembly of claim 2 wherein the isolator further comprises:
   opposing isolator end portions spaced along a working axis of the isolator; and
   a main spring mechanically coupled between the opposing isolator end portions in parallel with the hydraulic damper, at least a portion of the main spring located between the inductive heating device and the hydraulic damper;
   wherein the main spring is composed of a second material, which is less susceptible to inductive heating when immersed in the varying magnetic field than is the first material.

5. The isolator assembly of claim 1 wherein the inductive heating device is positioned such that the inductive input energy passes through the main spring prior to impinging the hydraulic damper.

6. The isolator assembly of claim 1 wherein the isolator further comprises a tuning spring mechanically coupled between the first and second isolator end portions in parallel with the main spring and in series with the hydraulic damper, the inductive heating device further circumscribing at least a portion of the tuning spring.

7. The isolator assembly of claim 6 wherein the main spring, the tuning spring, the hydraulic damper, and the inductive heating shroud are substantially coaxial.

8. The isolator assembly of claim 1 wherein the inductive heating device comprises an inductive heating shroud including:
   a generally tubular body peripherally bounding a cavity in which the isolator is received, at least in substantial part; and
   an endwall portion mounted to the first end portion of the isolator.

9. The isolator assembly of claim 1 wherein the isolator further comprises:
   a tuning spring mechanically coupled between the first and second isolator end portions in parallel with the main spring and in series with the hydraulic damper;
   a first vibration transmission path extending from the first isolator end portion, through the main spring, and to the second isolator end portion, while bypassing the tuning spring, the hydraulic damper, and the inductive heating device; and
   a second vibration transmission path extending from the first isolator end portion, through the hydraulic damper, through the tuning spring, and to the second isolator end portion, while bypassing the main spring and the inductive heating device.

10. The isolator assembly of claim 1 wherein the inductive heating device is removable from the isolator without disassembly thereof.

11. The isolator assembly of claim 1 wherein the damper coefficient-regulating inductive heating system further comprises a memory coupled to the controller and storing a predetermined temperature threshold; and
   wherein the controller is configured to active the inductive heating device to maintain the damping fluid temperature above the predetermined temperature threshold stored in the memory.

12. An isolator assembly, comprising:
an isolator including a hydraulic damper fillable with a damping fluid, the hydraulic damper comprising:
first and second hydraulic chambers containing the damping fluid when the damper is filled therewith;
first and second metal bellows peripherally bounding the first and second hydraulic chambers, respectively; and
a restricted orifice through which the first and second hydraulic chambers are fluidly coupled; and
an inductive heating shroud positioned around an outer circumference of the hydraulic damper in a non-contacting relationship to form a circumferential clearance between the inductive heating shroud and the hydraulic damper, the inductive heating shroud configured to direct energy through the circumferential clearance and to the hydraulic damper in a manner heating the first and second metal bellows and the damping fluid contacted thereby.

13. The isolator assembly of claim 12 wherein the inductive heating shroud, when energized, is configured generate a varying magnetic field in which the hydraulic damper is immersed to inductively heat the first and second metal bellows.

14. The isolator assembly of claim 12 wherein the isolator further comprises:
first and second isolator end portions, which are spaced along a working axis of the isolator;
a main spring mechanically coupled between the first and second isolator end portions in parallel with the hydraulic damper;
a tuning spring mechanically coupled between the first and second isolator end portions in parallel with the main spring and in series with the hydraulic damper;
a first vibration transmission path extending from the first isolator end portion, through the main spring, and to the second isolator end portion, while bypassing the tuning spring, the hydraulic damper, and the inductive heating shroud; and
a second vibration transmission path extending from the first isolator end portion, through the hydraulic damper, through the tuning spring, and to the second isolator end portion, while bypassing the main spring and the inductive heating shroud.

15. An isolator assembly, comprising:
an isolator having a hydraulic damper fillable with a damping fluid, the isolator comprising:
a fixed damper end portion;
a floating damper end portion; and
a metal bellows between the fixed and floating damper end portions; and
a damping coefficient-regulating inductive heating system, comprising:
a sensor configured to monitor data indicative of a damping fluid temperature;
an inductive heating device positioned around a periphery of the hydraulic damper in a non-contacting relationship; and
a controller operably coupled to the inductive heating device and the sensor, the controller configured to receive the data from the sensor and, in response thereto, control the inductive heating device to selectively apply inductive input energy to the hydraulic damper to heat the damping fluid contained therein,
wherein the floating damper end portion moves along the working axis relative to the fixed damper end portion and relative to the inductive heating device as the metal bellows expands and contracts.

16. The isolator assembly of claim 15 wherein the sensor comprises a temperature sensor mounted to the hydraulic damper at the fixed damper end portion thereof.

17. An isolator assembly, comprising:
an isolator having a hydraulic damper fillable with a damping fluid, the hydraulic damper comprising:
first and second hydraulic chambers contacted by the damping fluid when the hydraulic damper is filled therewith; and
first and second metal bellows peripherally bounding the first and second hydraulic chambers, respectively, the first and second metal bellows having outer surfaces principally impinged by an inductive input energy when applied by an inductive heating device; and
a damping coefficient-regulating inductive heating system, comprising:
a sensor configured to monitor data indicative of a damping fluid temperature;
the inductive heating device positioned around a periphery of the hydraulic damper in a non-contacting relationship; and
a controller operably coupled to the inductive heating device and the sensor, the controller configured to receive the data from the sensor and, in response thereto, control the inductive heating device to selectively apply inductive input energy to the hydraulic damper to heat the damping fluid contained therein.

18. The isolator assembly of claim 17 wherein the inductive heating device, when activated, is configured to induce concurrently heating of the first and second metal bellows at substantially equivalent rates.

* * * * *